Patented Sept. 13, 1949

2,481,876

UNITED STATES PATENT OFFICE 2,481,876

PRODUCTION OF SYNTHETIC RUBBER LATICES HAVING LARGE AVERAGE PARTICLE SIZE

Chester E. Rhines, Glen Rock, N. J., assignor to United States Rubber Company, New York, N. Y., a corporation of New Jersey No Drawing. Application November 8, 1945, Serial No. 627,537

12 Claims. (Cl. 260—23.7)

This invention relates to synthetic rubber latices, and more particularly to the production of synthetic rubber latices having a large average particle size.

Synthetic rubber latices, as is known, may be prepared by the emulsion polymerization in an aqueous medium of butadienes-1,3 or mixtures of butadienes-1,3 with other polymerizable compounds capable of forming copolymers with butadienes-1,3. Such aqueous emulsion polymerizates, or synthetic rubber latices, may be creamed by the addition of a hydrophilic colloidal creaming agent, such as is used for creaming natural rubber latex, which will cause the dispersion on standing to separate into a polymer-rich fraction and a polymer-poor fraction, which fractions may be separated from each other by simple mechanical means, such as decantation, drawing-off, and the like.

I have found that the average particle size of a synthetic rubber latex containing at least 0.5 part of sodium caprylate and not more than 0.5 part by weight of alkali soap of higher fatty acids per 100 parts of latex solids, may be permanently increased by lowering the temperature of the latex, without freezing, from about 20° C. to below 11° C. and maintaining the temperature of the latex below 11° C. for at least one-half hour. I have further found that such synthetic rubber latices which have been chilled in this manner may be creamed with conventional hydrophilic colloidal creaming agents to higher solids content creams than similar synthetic rubber latices which have not been so chilled. The sodium caprylate may be added to the synthetic rubber latex prepared in the usual manner provided the content of alkali soaps of higher fatty acids in the latex at the time of chilling is not more than 0.5 part by weight and is preferably not more than 0.3 part per 100 parts of latex solids. If desired, the sodium caprylate may be present as an emulsifying agent during the emulsion polymerization process of preparing the synthetic rubber latex. The amount of sodium caprylate in the latex should be from 0.5 part to 10 parts, or may even be as high as 20 parts, per 100 parts of latex solids, to accomplish the increase in average particle size on chilling of the latex.

The term "alkali soap of higher fatty acids" as used herein is employed to designate the alkali-metal, ammonium and amine soaps of the saturated and unsaturated monocarboxylic acids of the fatty acid series, which acids contain at least 10 carbon atoms, and which commonly may contain up to 24 carbon atoms. Larger amounts than 0.5 part by weight of such alkali soaps of higher fatty acids per 100 parts of solids of the latex prevent any substantial increase in the average particle size on chilling of synthetic rubber latices containing sodium caprylate, and preferably the content of alkali soap of higher-fatty acid is kept to not more than 0.3 part by weight per 100 parts of solids of the synthetic rubber latex, and such higher fatty-acid soaps may be entirely absent, if desired. The presence of anionic surface-active agents, such as the sulfated and sulfonated derivatives of the higher fatty acids, for example, commercial "Aquarex D" (sodium lauryl sulfate) and commercial "Nacconol NR" and "Nacconol NRSF," (dodecyl benzene sodium sulfonate containing about 55% and 8 to 13% respectively of sodium sulfate) does not interfere with the increase of the average particle size of synthetic rubber in the chilling process according to the present invention. Alkali soaps of higher fatty acids may be added in any desired amount to the synthetic rubber latex after the enlargement of the particles by chilling in the presence of sodium caprylate according to the invention.

The hydrophilic colloidal creaming agent which may be used to cream synthetic rubber latex, the average particle size of which has been increased according to the present invention, may be one of the conventional vegetable mucilages used in the creaming of natural latex, for example, alginates, locust seed or carob bean gum, pectates, Karaya gum, Irish moss, and the like. These vegetable mucilages may be used in amounts between .05 to 1% based on the water phase of the synthetic rubber latex, similarly to the creaming of natural rubber latex.

In the preparation of the synthetic rubber latex, as is known, polymerizable monomeric compounds are emulsified in an aqueous medium by means of an emulsifying agent, such as a soap or other surface active agent, and the polymerization is made to take place, generally at elevated temperatures, in the presence of a catalyst and other regulating materials. Examples of such polymerizable material are the various butadienes-1,3, for example, butadiene-1,3, methyl-2-butadiene-1,3 (isoprene), chloro-2-butadiene-1,3 (chloroprene), piperylene, and 2,3-dimethyl-butadiene-1,3. The polymerizable material as known may be a mixture of such a butadiene-1,3 with another polymerizable compound which is capable of forming rubbery copolymers with butadienes-1,3; for example, such mixture may comprise up to 70% of a compound which contains a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubbers of the above types are polymerized chloro-2-butadiene-1,3, known as neoprene or GR-M rubber, copolymers of butadiene-1,3 and styrene, known as Buna S or GR-S rubber, and copolymers of butadiene-1,3 and acrylonitrile, known as Buna N or GR-N rubber.

The following examples are illustrative of the present invention, all parts recited therein being parts by weight:

Example I

An emulsion was prepared according to the following formula: 50 parts butadiene-1,3; 50 parts styrene; 150 parts water; 1 part Nacconol NRSF; 0.25 part potassium oleate; 10 parts sodium caprylate; 0.2 part dodecyl mercaptan, and 0.1 part potassium persulfate. The Nacconol NRSF, potassium oleate and sodium caprylate were emulsifying and stabilizing agents, the dodecyl mercaptan a conventional polymerization regulator, and the potassium persulfate a conventional polymerization catalyst. The emulsion was polymerized for 21 hours at 50° C., giving an 89% conversion of monomeric materials to the butadienestyrene copolymer. One-half part of hydroquinone was added to stop the reaction and 0.5 part of dimethylamine to further stabilize the emulsion-polymerizate. Part of the synthetic rubber latex was permitted to cool to room temperature (about 20° C.) and part was chilled to 4° C., stored at this temperature for two days, and then permitted to come to room temperature. Particles of various sizes in samples of the unchilled and chilled latices were counted under the electron microscope, and the particle size distribution data are shown in the following table:

| Particle Diameter in Microns | Chilled Sample | | Unchilled Sample | |
|---|---|---|---|---|
| | No. of Particles | Per cent of Total Volume | No. of Particles | Per cent of Total Volume |
| .1 | 18 | .007 | 121 | 5.9 |
| .2 | 53 | .2 | 79 | 30.8 |
| .3 | 76 | .8 | 12 | 15.8 |
| .4 | 49 | 1.2 | 6 | 18.7 |
| .5 | 34 | 1.7 | 3 | 18.3 |
| .6 | 12 | 1.0 | 1 | 10.5 |
| .7 | 3 | .4 | | |
| .8 | 13 | 2.6 | | |
| .9 | 7 | 2.0 | | |
| 1.0 | 23 | 9.0 | | |
| 1.1 | 4 | 2.1 | | |
| 1.2 | 9 | 6.1 | | |
| 1.3 | 15 | 13.0 | | |
| 1.4 | 2 | 2.2 | | |
| 1.5 | 13 | 17.2 | | |
| 1.6 | 0 | 0 | | |
| 1.7 | 2 | 3.9 | | |
| 1.8 | 5 | 11.5 | | |
| 1.9 | 0 | 0 | | |
| 2.0 | 8 | 25.2 | | |

The average surface/volume ratio (i. e., the average surface per unit volume) of the synthetic rubber particles in the unchilled synthetic rubber latex sample calculated to be $22 \times 10^4$ $cm.^2/cm.^3$, and in the chilled sample $4.3 \times 10^4$ $cm.^2/cm.^3$. Similar calculations give Hevea latex a surface/volume ratio of $8.6 \times 10^4$ $cm.^2/cm.^3$. A high surface/volume ratio in a dispersion shows a small particle size condition. The chilling of the synthetic rubber latex increased the average particle size from a value much less than that of natural Hevea latex to a value larger than that of Hevea latex. Observations with an optical microscope showed that the chilled sample had easily visible particles whereas the unchilled sample had almost no particles in the visible range.

A portion of the synthetic rubber latex which had been chilled to 4° C. was allowed to cream for 6 days, with 0.1% ammonium alginate based on the water phase. The cream contained 59.6% solids, which is a very much higher solids concentration than obtainable with creams from similar latices prepared with the usual 5 to 10 parts of alkali soap of higher fatty acids, or from the same latex which has not been chilled.

Example II

An emulsion was prepared according to the following formula: 50 parts butadiene-1,3; 50 parts styrene; 67 parts water; 1 part Nacconol NR; 0.5 part Nacconol NRSF; 0.1 part sodium oleate; 3 parts sodium caprylate; 0.2 part dodecyl mercaptan; 0.2 part potassium persulfate. The emulsion was polymerized for 21 hours at 50° C. The sample had become quite viscous because of the fine particle condition, at the end of this period. The synthetic rubber latex was chilled at about 0° C. for 1 hour. On being re-warmed to 50° C., the product became fluid and had the characteristic white appearance of a large particle size latex. Additional polymerization was carried out at 50° C. for 4 hours more, after which the latex was treated with 50 parts of water, 0.1 part of hydroquinone and 0.5 part of dimethylamine. The latex was very fluid, stable, and contained visible particles of the size range characteristic of Hevea latex, according to light microscope observations. Particle size distribution data as obtained by electron microscope measurements gave a calculated surface/volume ratio of $7.8 \times 10^4$ $cm.^2/cm.^3$, indicating that the particles were on the average somewhat larger than those in Hevea latex (for which a value of $8.6 \times 10^4$ $cm.^2/cm.^3$ had been obtained).

Example III

An emulsion was prepared according to the following formula: 50 parts butadiene-1,3; 50 parts styrene; 100 parts water; 1 part Nacconol NRSF; 0.1 part sodium oleate; 0.3 part dodecyl mercaptan; 0.2 part potassium persulfate. The emulsion was polymerized for 24 hours at 50° C. A synthetic rubber latex of 49.7% total solids was produced having particles invisible under the light microscope. To a portion of the latex was added 10 parts of sodium caprylate per 100 parts of solids of the latex, and the latex was chilled at about 0° C. for one hour and then warmed to room temperature. The average particle size had become considerably greater, and under a light microscope particles could be seen in the latex similar to those in natural Hevea latex.

Example IV

An emulsion was prepared according to the following formula: 50 parts butadiene-1,3; 47 parts styrene; 3 parts acrylonitrile; 67 parts water; 1.25 parts Nacconol NR; 3 parts sodium caprylate; 0.2 part sodium pelargonate; 0.3 part dodecyl mercaptan; 0.2 part sodium persulfate. The sodium pelargonate was an additional emulsifying and stabilizing agent. The emulsion was polymerized for 21 hours at 60° C., and then for 3 hours at 50° C. The synthetic rubber latex was chilled for 2 hours at 10° C., after which there was added 25 parts of water containing 0.5 part hydroquinone and 0.25 part of dimethylamine. The total solids content was 53%. The particles, at a magnification 480 times in the light microscope, appeared to be in the same size range as Hevea latex particles.

Example V

An emulsion was prepared according to the following formula: 50 parts butadiene-1,3; 50 parts styrene; 90 parts water; 4 parts sodium caprylate; 0.5 part sodium pelargonate; 0.2 part sodium oleate; 0.3 part dodecyl mercaptan; 0.2 part sodium persulfate. The emulsion was polymerized at 60° for the first 5 hours and at 50° C. for the next 15 hours. A viscous latex with particles invisible under the ordinary light microscope was produced. The latex contained 54.6% total solids and the conversion of monomer to copolymer was 97%. The latex was further stabilized by adding 0.12% of dimethylamine based on the total weight of the latex.

A 2 liter portion of the latex as above prepared was chilled at about 0° C. for 5½ hours and an enlargement of particles to a size easily visible under the ordinary light microscope occurred. This 2 liter portion of latex was further stabilized by the addition of 25 grams of 10% dimethylamine oleate. The resultant latex was non-viscous, and had no tendency to form coagulum on standing.

A second 2 liter portion was chilled at about 0° C. for 6 hours. Enlargement to easily visible particles took place. This 2 liter portion of latex was further stabilized by the addition of 75 grams of 10% dimethylamine oleate, giving a total solids content of 50.9%. The latex was stable and flowed freely. The addition of the large amount of alkali soap of a higher fatty acid (dimethylamine oleate) did not visibly change the size of the particles in the synthetic rubber latex.

It is evident that alkali soaps of the higher fatty acids may be added to a synthetic rubber latex which has been chilled and the particle size of which has been enlarged according to the present invention without appreciably affecting the particle size enlargement, but such amounts of alkali soaps of higher fatty acids will prevent the enlargement of the latex particles if present at the time of chilling in the presence of the sodium caprylate. To a sample of the latex treated as in the preceding paragraph was added 1% of dimethylamine oleate based on the solids of the latex and 0.1% of ammonium alginate based on the water content, and the latex was diluted to 30% total solids. The thus treated latex was allowed to cream for 19 days at room temperature (about 27° C.), the cream obtained having 57.4% total solids content. Without the chilling step the same latex would cream to only about 40% solids.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of producing a synthetic rubber latex having a large average particle size which comprises lowering the temperature without freezing of a synthetic rubber latex comprising an aqueous emulsion polymerizate of polymerizable material selected from the group consisting of butadiene-1,3, isoprene, chloroprene, piperylene and 2,3-dimethyl butadiene-1,3 and mixtures of such butadienes-1,3 with up to 70% of the mixture of other polymerizable compounds which contain a single $CH_2=C<$ group and are capable of forming copolymers with such butadienes-1,3 and containing 0.5 to 20 parts by weight of sodium caprylate and not more than 0.5 part of alkali soap of higher fatty acids containing at least 10 carbon atoms per 100 parts of latex solids, from above 20° C. to within the range below 11° C. to 0° C. and maintaining the temperature of the latex within the range below 11° C. to 0° C. for at least one-half hour.

2. The method of producing a synthetic rubber latex having a large average particle size which comprises lowering the temperature without freezing of a synthetic rubber latex comprising an aqueous emulsion polymerizate of polymerizable material selected from the group consisting of butadiene-1,3, isoprene, chloroprene, piperylene and 2,3-dimethyl butadiene-1,3, and mixtures of such butadienes-1,3 with up to 70% of the mixture of other polymerizable compounds which contain a single $CH_2=C<$ group and are capable of forming copolymers with such butadienes-1,3 and containing 0.5 to 20 parts by weight of sodium caprylate and not more than 0.5 part of alkali soap of higher fatty acids containing at least 10 carbon atoms, per 100 parts of latex solids, from above 20° C. to below 11° C. and maintaining the temperature of the latex below 11° C. without freezing the latex for at least one-half hour.

3. The method of producing a synthetic rubber latex having large particle size which comprises lowering the temperature without freezing of a synthetic rubber latex comprising an aqueous emulsion polymerizate of a mixture of butadiene-1,3 with up to 70% of the mixture of a compound which contains a single $CH_2=C<$ group and is copolymerizable with butadiene-1,3 and containing 0.5 to 10 parts by weight of sodium caprylate and not more than 0.3 part of alkali soap of higher fatty acids containing at least 10 carbon atoms per 100 parts of latex solids, from above 20° C. to below 11° C. and maintaining the temperature of the latex below 11° C. without freezing the latex for at least one-half hour.

4. The method of producing a synthetic rubber latex having large particle size which comprises lowering the temperature without freezing of a synthetic rubber latex comprising an aqueous emulsion polymerizate of a mixture of butadiene-1,3 with up to 70% of the mixture of a compound which contains a single $CH_2=C<$ group and is copolymerizable with butadiene-1,3 and containing 0.5 to 10 parts by weight of sodium caprylate and not more than 0.3 part of alkali soap of higher fatty acids containing at least 10 carbon atoms, per 100 parts of latex solids, from above 20° C. to within the range below 11° C. to 0° C. and maintaining the temperature of the latex within the range below 11° C. to 0° C. for at least one-half hour.

5. The method of producing a synthetic rubber latex having a large average particle size which comprises lowering the temperature without freezing of a synthetic rubber latex comprising an aqueous emulsion polymerizate of a mixture of butadiene-1,3 and styrene, and containing 0.5 to 20 parts by weight of sodium caprylate and not more than 0.5 part of alkali soap of higher fatty acids containing at least 10 carbon atoms per 100 parts of latex solids, from above 20° C. to below 11° C. and maintaining the temperature of the latex below 11° C. without freezing the latex for at least one-half hour.

6. The method of producing a synthetic rubber latex having large particle size which comprises lowering the temperature without freezing of a synthetic rubber latex comprising an aqueous emulsion polymerizate of a mixture of butadiene-1,3 and styrene and containing 0.5 to 10 parts by weight of sodium caprylate and not more than 0.3 part of alkali soap of higher fatty acids containing at least 10 carbon atoms per 100 parts of latex solids, from above 20° C. to within the range below 11° C. to 0° C. and maintaining the temperature of the latex within the range below 11° C. to 0° C. for at least one-half hour.

7. The method which comprises creaming with a hydrophilic colloidal creaming agent a synthetic rubber latex comprising an aqueous emulsion polymerizate of polymerizable material selected from the group consisting of butadienes-1,3 and mixtures of such butadiene-1,3, isoprene, chloroprene, piperylene and 2,3-dimethyl butadiene-1,3, with up to 70% of the mixture of other polymerizable compounds which contain a single $CH_2=C<$ group and are capable of forming copolymers with such butadienes-1,3, which latex has been chilled without freezing from a temperature above 20° C. to below 11° C. and maintained at a temperature below 11° C. without freezing the latex for at least one-half hour in the presence of 0.5 to 20 parts by weight of sodium caprylate and not more than 0.5 part of alkali soap of higher fatty acids containing at least 10 carbon atoms per 100 parts of latex solids.

8. The method which comprises creaming with a hydrophilic colloidal creaming agent a synthetic rubber latex comprising an aqueous emulsion polymerizate of polymerizable material selected from the group consisting of butadiene-1,3, isoprene, chloroprene, piperylene and 2,3-dimethyl butadiene-1,3, and mixtures of such butadienes-1,3 with up to 70% of the mixture of other polymerizable compounds which contain a single $CH_2=C<$ group and are capable of forming copolymers with such butadienes-1,3, which latex has been chilled without freezing from a temperature above 20° C. to within the range below 11° C. to 0° C. and maintained at a temperature within the range below 11° C. to 0° C. for at least one-half hour in the presence of 0.5 to 20 parts by weight of sodium caprylate and not more than 0.5 part of alkali soap of higher fatty acids containing at least 10 carbon atoms per 100 parts of latex solids.

9. The method which comprises creaming with a hydrophilic colloidal creaming agent a synthetic rubber latex comprising an aqueous emulsion polymerizate of a mixture of butadiene-1,3 with up to 70% of the mixture of a compound which contains a single $CH_2=C<$ group and is copolymerizable with butadiene-1,3 which latex has been chilled without freezing from a temperature above 20° C. to within the range below 11° C. to 0° C. and maintained at a temperature within the rang below 11° C. to 0° C. for at least one-half hour in the presence of 0.5 to 10 parts by weight of sodium caprylate and not more than 0.3 part of alkali soap of higher fatty acids containing at least 10 carbon atoms per 100 parts of latex solids.

10. The method which comprises creaming with a hydrophilic colloidal creaming agent a synthetic rubber latex comprising an aqueous emulsion polymerizate of a mixture of butadiene-1,3 with up to 70% of the mixture of a compound which contains a single $CH_2=C<$ group and is copolymerizable with butadiene-1,3 which latex has been chilled without freezing from a temperature above 20° C. to below 11° C. and maintained at a temperature below 11° C. without freezing the latex for at least one-half hour in the presence of 0.5 to 10 parts by weight of sodium caprylate and not more than 0.3 part of alkali soap of higher fatty acids containing at least 10 carbon atoms per 100 parts of latex solids.

11. The method which comprises creaming with a hydrophilic colloidal creaming agent a synthetic rubber latex comprising an aqueous emulsion polymerizate of a mixture of butadiene-1,3 and styrene, which latex has been chilled without freezing from a temperature above 20° C. to below 11° C. and maintained at a temperature below 11° C. without freezing the latex for at least one-half hour in the presence of 0.5 to 20 parts by weight of sodium caprylate and not more than 0.5 part of alkali soap of higher fatty acids containing at least 10 carbon atoms per 100 parts of latex solids.

12. The method which comprises creaming with a hydrophilic colloidal creaming agent a synthetic rubber latex comprising an aqueous emulsion polymerizate of a mixture of butadiene-1,3 and styrene, which latex has been chilled without freezing from a temperature above 20° C. to within the range below 11° C. to 0° C. and maintained at a temperature within the range below 11° C. to 0° C. for at least one-half hour in the presence of 0.5 to 10 parts by weight of sodium caprylate and not more than 0.3 part of alkali soap of higher fatty acids containing at least 10 carbon atoms per 100 parts of latex solids.

CHESTER E. RHINES.

REFERENCES CITED

The following references are of record in the file of this patent:

UNITED STATES PATENTS

| Number | Name | Date |
| --- | --- | --- |
| 2,357,861 | Wilson | Sept. 12, 1944 |
| 2,393,261 | Peaker | Jan. 22, 1946 |